United States Patent Office 3,108,081
Patented Oct. 22, 1963

3,108,081
CATALYST AND MANUFACTURE THEREOF
William K. T. Gleim, Island Lake, and Peter Urban, Northbrook, Ill., assignors to Universal Oil Products Company, Des Plaines, Ill., a corporation of Delaware
No Drawing. Filed July 17, 1959, Ser. No. 827,709
11 Claims. (Cl. 252—428)

This is a continuation-in-part of our copending application Serial No. 799,204, now Patent No. 2,988,500, filed March 13, 1959, as a continuation-in-part of Serial No. 714,937, February 13, 1958, now Patent No. 2,882,224, and relates to a solid catalyst and to the manufacture thereof.

In our parent application Serial No. 799,204, we have described a process for the treatment of hydrocarbon distillate in which the hydrocarbon distillate is passed into contact with a fixed bed of a phthalocyanine catalyst composited with a carrier. This process is used to treat sour hydrocarbon distillates in order to react the mercaptans contained therein with an oxidizing agent. The sour hydrocarbon distillate particularly comprises gasoline, including cracked gasoline, straight run gasoline, natural gasoline or mixtures thereof. The process also is used for the treatment of other sour hydrocarbon distillates including, for example, naphtha, jet fuel, kerosene, aromatic solvent, stove oil, range oil, fuel oil, etc. Other hydrocarbon distillates include lubricating oil and the process also may be used for the treatment of normally gaseous fractions. In still another embodiment, the process may be utilized for purifying other organic fractions containing certain acidic components. These organic fractions include alcohols, ketones, aldehydes, etc.

In one embodiment the present invention relates to a solid composite of an adsorptive carrier and a phthalocyanine catalyst.

In another embodiment the present invention relates to a method of compositing an adsorptive carrier and a phthalocyanine catalyst, which comprises forming a solution of the phthalocyanine catalyst in a solvent, commingling said solution with particles of said adsorptive carrier, and subsequently heating the resultant composite of carrier and catalyst.

As hereinbefore set forth, the composite of phthalocyanine catalyst and carrier is utilized as a catalyst for purifying sour hydrocarbon distillates. The catalyst is utilized as a fixed bed in a treating zone, and the hydrocarbon distillate is contacted therewith at the desired operating conditions. In many cases it is desirable to use a packing material in the treating zone and, in accordance with the present invention, the fixed bed of catalyst and carrier serves the dual purpose of providing a catalyst required for the oxidation of mercaptans and also to provide the desired packing material in the treating zone. In still another embodiment, the catalyst particles may be utilized as a slurry in the hydrocarbon distillate, caustic or other suitable liquid and carried into and, in some cases, out of the treating zone.

The purification of sour distillate is accomplished by reacting the mercaptans contained in said distillate with oxygen to thereby convert the mercaptans into disulfides. This reaction is effected in the presence of an alkaline reagent solution which is passed together with the hydrocarbon distillate into contact with the catalyst. Any suitable alkaline reagent solution may be used and preferably comprises an aqueous caustic solution (sodium hydroxide). Other suitable alkaline solutions may be employed and particularly potassium hydroxide. Still other alkaline solutions include lithium hydroxide, rubidium hydroxide and cesium hydroxide. Similarly, while water is the preferred solvent for the alkaline reagent, it is understood that other solvents may be employed including, for example, alcohols and particularly methanol, ethanol, propanol, butanol, etc., ketones including acetone, methylethyl ketone, etc. In some cases the treating is effected in the presence of both an aqueous solution of the alkaline reagent and an alcohol, particularly methanol or ethanol or other solutizers or solubilizers including, for example, phenols, cresols, butyric acid, etc.

The treatment of the sour distillate usually is effected at ambient temperature, although elevated temperature may be used and generally will not exceed about 300° F. Atmospheric pressure usually is employed, although superatmospheric pressures of about 1000 pounds per square inch or more may be employed. The time of contact in the treating zone will be selected to give the desired reduction in mercaptan content and may range from a liquid hourly space velocity of 1 up to 100 or more, depending upon the size of the treating zone, the amount of catalyst and the particular distillate being treated.

As hereinbefore set forth, the purification of the hydrocarbon distillate is effected by oxidation of mercaptans to disulfides. Accordingly, the reaction is effected in the presence of an oxidizing agent and preferably air, although oxygen or other oxygen-containing agents may be employed. The mixture of hydrocarbon distillate, alkaline reagent and oxidizing agent is passed upwardly or, when desired, downwardly, through the bed of catalyst composite. In some cases the air may be passed countercurrently to the hydrocarbon distillate. In still other cases the hydrocarbon distillate and alkaline solution may be introduced separately into the treating zone.

In many cases sour hydrocarbon distillate, and particularly gasoline, is first treated with an alkaline reagent solution in order to remove a major portion of the mercaptans prior to further treating in the manner hereinbefore described. Any suitable alkaline reagent, and particularly sodium hydroxide or potassium hydroxide, solution is utilized. This removes a major portion of the mercaptans but still leaves a distillate which is sour. Further conversion of the mercaptans is effected in the presence of the fixed bed catalyst herein described.

Subsequent to the extraction of mercaptans, an alkaline reagent solution containing the mercaptans as mercaptides is subjected to regeneration. In a preferred operation, this regeneration is effected by oxidation in the presence of a suitable catalyst to regenerate the alkaline metal hydroxide and to form disulfides. As another advantage to the catalyst composite of the present invention, regeneration of the used alkaline solution is effected in the presence of this catalyst and air, oxygen or other suitable oxidizing agent.

As hereinbefore set forth, the present application is directed to the novel composite of carrier and phthalocyanine catalyst, as well as to the method of preparing this composite. Any suitable phthalocyanine catalyst may be utilized and preferably comprises a metal phthalocyanine. Particularly preferred metal phthalocyanines comprise cobalt phthalocyanine and vanadium phthalocyanine. Still more preferably the metal phthalocyanine is utilized as a derivative thereof. A particularly preferred derivative is the sulfonated derivative. Thus, a particularly preferred phthalocyanine catalyst comprises cobalt phthalocyanine sulfonate. Such a catalyst is available commercially and comprises a mixture of cobalt phthalocyanine monosulfonate and disulfonate. In general, the monosulfonate is preferred. Another preferred catalyst comprises vanadium phthalocyanine sulfonate. These compounds may be obtained from any suitable source or may be prepared in any suitable manner as, for example, by reacting cobalt, vanadium or other metal phthalocynines with fuming sulfuric acid. While the sulfonic acids are particularly preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

The phthalocyanine catalyst is composited with a suitable adsorptive carrier. The carrier should be insoluble in or substantially unaffected by the caustic solution and hydrocarbons under the conditions prevailing in the treating zone. Activated carbon is particularly preferred because of its high adsorptivity and stability under these conditions. Other carbon carriers include coke, charcoal which may be obtained from any suitable source including bone char, wood charcoal, charcoal made from coconut or other nut shells, fruit pits, etc. Other carriers include silica as, for example, sand, glass beads, etc., clays and silicates including those synthetically prepared and naturally occurring, preferably acid, heat or otherwise treated as, for example, Attapulgus clay, china clay, diatomaceous earth, feldspar, fuller's earth, halloysite, kaolin, kieselguhr, mica, montmorillonite, pumice, etc., aluminas and particularly alpha aluminas including corundum, emery, etc., ceramics, porcelain, various magnesium compounds, titanium compounds, zirconium compounds, etc. As hereinbefore set forth, the choice of the carrier will be made with reference to its adsorptive or spacing properties and to its stability in the alkaline reagent solution and hydrocarbons at the conditions prevailing in the treating zone.

The composite of phthalocyanine and carrier may be prepared in any suitable manner. In one method the carrier may be formed into particles of uniform or irregular size and shape, including spheres, pills, pellets, rings, saddles, flakes, etc. and the carrier in intimately contacted with a solution of the phthalocyanine catalyst. An aqueous or alkaline solution of the phthalocyanine catalyst is prepared and, in a preferred embodiment, the carrier particles are soaked, dipped, suspended or immersed in the solution. In another method, the solution may be sprayed onto, poured over or otherwise contacted with the carrier.

In general it is preferred to use an aqueous solution of the phthalocyanine catalyst. In some cases solubility of the catalyst in water is facilitated by incorporating ammonia, ammonium hydroxide, sodium hydroxide or other alkaline material, generally in small amounts which usually will not be greater than 20% by volume of the aqueous medium. Excess solution may be removed in any suitable manner, and the carrier containing the catalyst is allowed to dry at room temperature, dried in an oven or by means of hot gases passed thereover, or in any other suitable manner.

In general it is preferred to composite as much catalyst with the carrier as will form a stable composite, although a lesser amount may be so deposited, if desired. In one preparation, 1% by weight of cobalt phthalocyanine sulfonate catalyst was composited with activated carbon by soaking granules of the carbon in a solution of the phthalocyanine catalyst. In another method, the carrier may be deposited in the treating zone and the phthalocyanine catalyst solution passed therethrough in order to form the catalyst composite in situ. If desired, the solution may be recycled one or more times in order to prepare the desired composite. In still another embodiment the carrier may be deposited in the treating chamber and the chamber filled with a solution of the catalyst, thereby forming the composite in situ.

The catalyst composite is active and stable. Accordingly, the fixed bed catalyst composite may be used for treating a large volume of sour hydrocarbon distillate. Although the phthalocyanine catalyst is soluble in alkaline treating solutions, the catalyst will be retained on the carrier. However, should any catalyst be carried away in the alkaline solution, it will be recycled in the alkaline solution to the process and reused therein. However, in some cases, it may be desirable to introduce additional phthalocyanine catalyst, particularly after long periods of time.

The following examples are introduced to illustrate further the novelty and utility of the present invention but not with the intention of unduly limiting the same.

Example I

A composite of cobalt phthalocyanine sulfonate on activated carbon was prepared as follows: The carbon is a commercially available product marketed under the trade name of "Nuchar type WA" and is supplied in granules of 30–40 mesh. It is stated that the carbon is formed from residual organic material which is recovered during the manufacture of pulp and then is carbonized and activated by heating. A small scale preparation was made by dissolving 0.15 gram of cobalt phthalocyanine sulfonate in 25 cc. of water, to which 1 cc. of ammonium hydroxide (28%) solution was added. 100 cc. of water then was added thereto and the mixture was stirred. 15 grams (100 cc.) of the activated carbon granules were poured into the solution, stirred slightly and allowed to stand over night. The following day, the mixture was filtered to separate excess water. 41.9 grams of solid material were recovered and were dried under water pump vacuum to leave a dry composite of 15.2 grams. The filtrate was a faint blue color but was analyzed and found to contain no cobalt. Accordingly, the final catalyst composite contained 1% by weight of the phthalocyanine catalyst.

Example II

The catalyst composite prepared as described in Example I was installed as a fixed bed in a treating zone and used for the treatment of various hydrocarbon distillates. One distillate treated was a JP-4 jet fuel having an API gravity of 56.1°, a boiling range of 148° to 484° F. and a mercaptan sulfur content of 0.0132% by weight. The treating zone contained 100 cc. of the catalyst composite prepared as described in Example I. The caustic solution used was a 10° Baumé aqueous solution. The flow rates used were: jet fuel at 50 cc. per hour, caustic at 30 cc. per hour and air at 96 cc. per hour. These were commingled and passed through the treating zone in upward flow. The treating zone was maintained at a temperature of 104° F. and a pressure of 100 p.s.i.g. This run continued for 28 hours, during which time the mercaptan sulfur content was reduced to 0.00026% by weight and below. The jet fuel recovered from the settler was sweet to the doctor test.

Example III

The hydrocarbon distillate of this example is a commercial kerosene having a mercaptan sulfur content of 0.0058% by weight. The flow rates used in this example are: kerosene at 100 cc. per hour, caustic at 50 cc. per hour and air at 96 cc. per hour. The caustic solution and treating zone temperature and pressure were the same as described in Example II.

This run continued for 41 hours, during which time the mercaptan sulfur content of the kerosene was reduced to 0.00022–0.00034% by weight. In all cases the kerosene was sweet to the doctor test.

Example IV

The hydrocarbon distillate of this example is a blend of thermally cracked and straight run gasolines, the blend having an API gravity of 65.5°, a boiling range of 90° to 393° F. and a mercaptan sulfur content of 0.0130% by weight. The gasoline blend was treated in the same manner as described in Example II and III, using the same treating zone temperature and pressure. The flow rates in this case were hydrocarbon at 100 cc. per hour, caustic solution at 30 cc. per hour and air at 96 cc. per hour.

The above runs continued for 40 hours, during which time the mercaptan sulfur content of the gasoline blend was reduced to 0.00028 to 0.00040% by weight. In all cases the gasoline was sweet to the doctor test.

*Example V*

The hydrocarbon distillate of this example is a $C_5$ hydrocarbon fraction recovered as an overhead from a depentanizer. The solid bed of catalyst was prepared by soaking 100 cc. of carbon Raschig rings in a 10° Baumé aqueous solution containing 50 parts per million of cobalt phthalocyanine sulfonate, followed by filtering and drying in the manner hereinbefore described. The catalyst composite was disposed as a fixed bed in the treating zone and the reaction mixture passed therethrough in upward flow. The rates were as follows: $C_5$ hydrocarbon charge at 100 cc. per hour, caustic recycle rate at about 40 cc. per hour and air at 54 cc. per hour. The treating zone was maintained at a temperature of 104° F. and a pressure of 30 p.s.i.g.

The above run was continued for 63 hours, during which the mercaptan sulfur content of the $C_5$ fraction was reduced to 0.0002% to 0.0004% by weight. In all cases the product was sweet to the doctor test.

*Example VI*

This example describes a process for treating a No. 2 commercial fuel oil having a mercaptan sulfur content of about 0.040% by weight. The catalyst used in this example is vanadium phthalocyanine sulfonate composited with sand, filtered and dried and used as a fixed bed in a treating zone. The alkaline reagent solution is potassium hydroxide of 12° Baumé. The fuel oil, air and potassium hydroxide solution are passed downwardly through a treating zone containing a bed of the catalyst composite. The treating is effected at ambient temperature and 25 p.s.i.g. In this operation, the mercaptan sulfur content of the kerosene is reduced to below 0.025%. In this case, this reduction is more than satisfactory to produce a final blend of the treated fuel oil with other refinery products to meet the particular mercaptan sulfur specifications of below 0.01% by weight.

*Example VII*

Another preparation of catalyst composite was made as follows: Two pounds of cobalt phthalocyanine sulfonate were dissolved in 1000 pounds of water. Two hundred pounds of activated carbon ("Nuchar type WA") were placed in a glass lined, steam jacketed rotary drum. The solution of cobalt phthalocyanine sulfonate was added to the rotary drum, and intimate mixing obtained by rotating the drum for two hours. Steam at 45 pounds per square inch pressure then was passed through the jacket and the drum rotated for an additional hour at this temperature. Excess water was drained off and preheated air at 235° F. was passed through the catalyst composite for 16 hours to reduce the water content of the composite to less than 5% by weight. The catalyst composite was recovered and contained 1% by weight of phthalocyanine catalyst. In another method, the initial mixing of the solution and carbon particles is effected at elevated temperature, which may range from 200° to 500° F. or more. This serves to reduce the time required in manufacturing the catalyst.

We claim as our invention:

1. A solid composite of an adsorptive carrier and a catalytic amount of a phthalocyanine catalyst.
2. A solid composite of an adsorptive carrier and a catalytic amount of cobalt phthalocyanine sulfonate.
3. A solid composite of activated carbon and a catalytic amount of cobalt phthalocyanine monosulfonate.
4. A solid composite of activated carbon and a catalytic amount of vanadium phthalocyanine monosulfonate.
5. A solid composite of activated carbon and about 1% by weight of cobalt phthalocyanine sulfonate.
6. A solid composite of an adsorptive carrier selected from the group consisting of carbon and siliceous materials and a catalytic amount of a phthalocyanine catalyst selected from the group consisting of cobalt phthalocyanine sulfonate and vanadium phthalocyanine sulfonate.
7. A solid composite of activated carbon and about 1% by weight of a phthalocyanine catalyst selected from the group consisting of cobalt phthalocyanine sulfonate and vanadium phthalocyanine sulfonate.
8. A method of preparing a composite of a solid adsorptive carrier and a phthalocyanine catalyst which comprises forming a solution of said phthalocyanine catalyst in an aqueous solvent, commingling a sufficient quantity of said solution with particles of said adsorptive carrier to incorporate a catalytic amount of the phthalocyanine catalyst into the carrier, and subsequently heating the resultant composite of carrier and catalyst.
9. A method of preparing a composite of activated carbon and cobalt phthalocyanine sulfonate, which comprises forming a solution of cobalt phthalocyanine sulfonate in an aqueous solvent, commingling a sufficient quantity of said solution with particles of said activated carbon to deposit a catalytic amount of said sulfonate on the carbon, and subsequently heating the resultant composite of activated carbon and cobalt phthalocyanine sulfonate.
10. A method of preparing a composite of activated carbon and cobalt phthalocyanine monosulfonate, which comprises forming a solution of cobalt phthalocyanine monosulfonate in an aqueous solvent, commingling a sufficient quantity of said solution with particles of said activated carbon to deposit a catalytic amount of said sulfonate on the carbon, draining off excess solvent, and drying the resultant composite.
11. A method of preparing a composite of activated carbon and vanadium phthalocyanine sulfonate, which comprises forming a solution of vanadium phthalocyanine sulfonate in an aqueous solvent, commingling a sufficient quantity of said solution with particles of said activated carbon to deposit a catalytic amount of said sulfonate on the carbon, draining off excess solvent, and drying the resultant composite.

References Cited in the file of this patent

UNITED STATES PATENTS

| | | |
|---|---|---|
| 2,849,508 | Pines | Aug. 26, 1958 |
| 2,882,224 | Gleim et al. | Apr. 14, 1959 |
| 2,954,405 | Hock et al. | Sept. 27, 1960 |